Sept. 3, 1963     M. L. ANTHONY     3,103,006
MACHINE TOOLS
Filed June 15, 1960     3 Sheets-Sheet 1
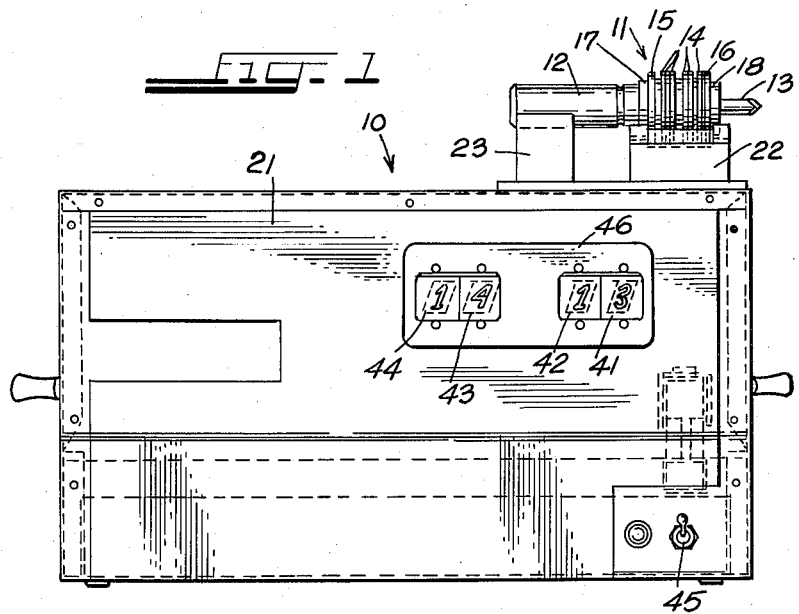
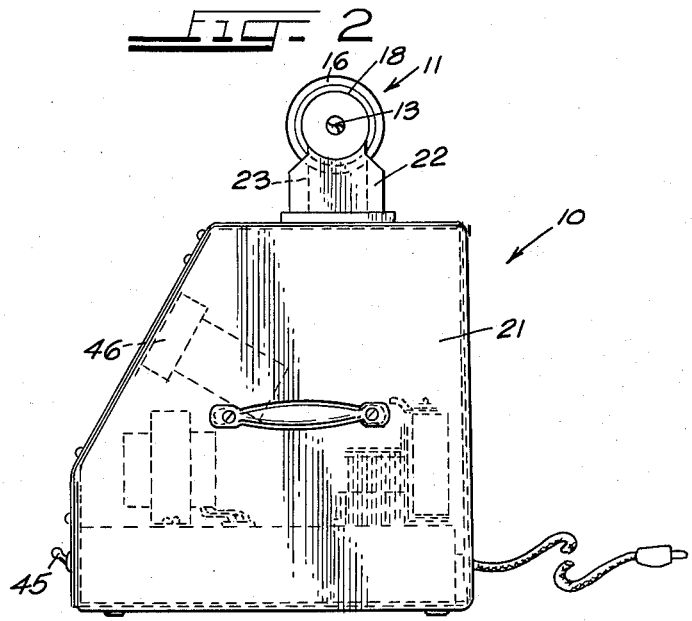
INVENTOR.
MYRON L. ANTHONY
BY
Wallace, Kinzer and Dorn
ATTYS.

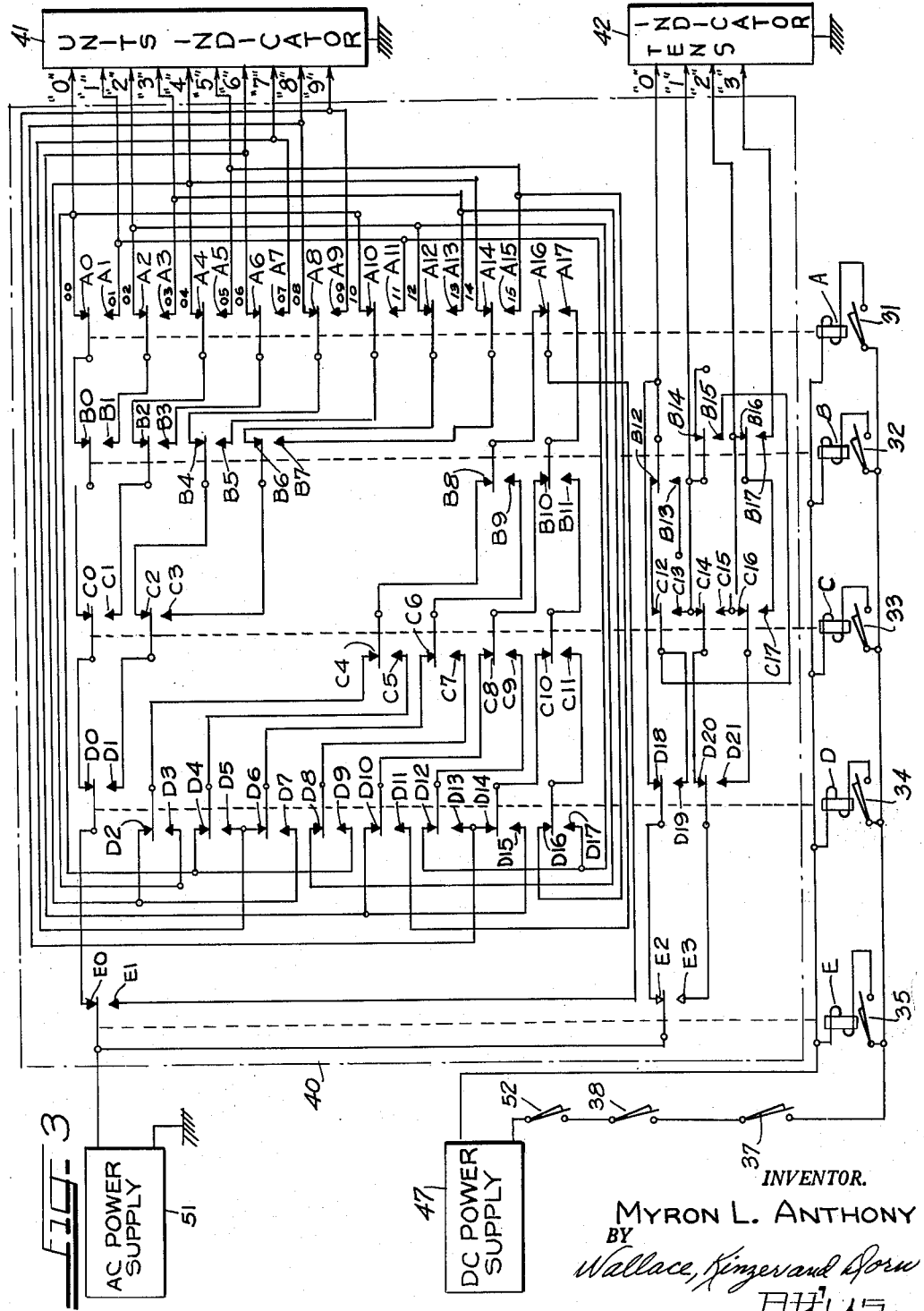

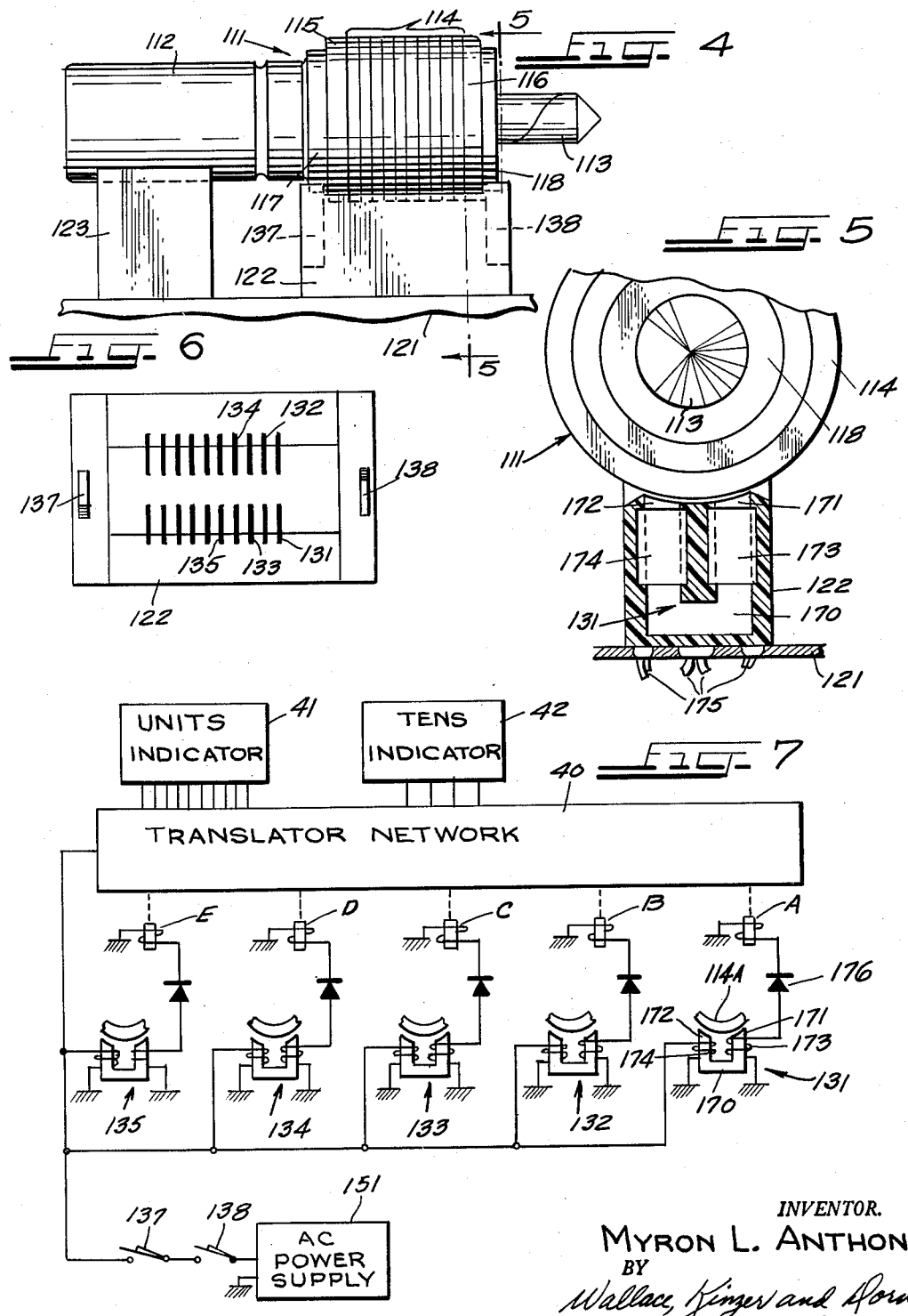

United States Patent Office 3,103,006
Patented Sept. 3, 1963

3,103,006
MACHINE TOOLS
Myron L. Anthony, La Grange, Ill., assignor to Scully-Anthony Corporation, La Grange, Ill., a corporation of Illinois
Filed June 15, 1960, Ser. No. 36,311
6 Claims. (Cl. 340—324)

This invention relates to a new and improved automatic machine tool system and more particularly to a direct-reading identification device for tool assemblies bearing code data used to identify the assembly and control the use thereof in automatic machine tools.

In a data-controlled machine tool, provisions must be made, in many instances, to identfy individual cutting tools or similar members, or their functions, in order to permit interchange of the tools in the course of an operating cycle entailing a number of different machining operations. The individual tools or the toolholders for the tools may be provided with code designations to permit machine identification. In this specification, and throughout the appended claims, the term "tool assembly" is used in a generic sense to identify either the tool itself or the assembly of the tool in a toolholder or like associated member. The coding of the tool assemblies may take the form of a series of code rings or other code elements located at predetermined positions on the tool assembly, the number and spacing of the elements serving to identify the tool or its function. On the other hand, the code data may be in the form of a plurality of code elements which are physically similar but are selected from two groups having different field-coupling properties. An example of a system of this kind would be a coding system utilizing an individual magnetic code elements in conjunction with similar non-magnetic code elements. Another coding arrangement of this kind could be based upon the use of electrically conductive and non-conductive code elements. Coding systems based upon the use of code elements having different field-coupling properties are described in substantial detail in the co-pending application of Myron L. Anthony, Serial No. 23,046, filed April 18, 1960.

As a practical matter, it is usually preferable to encode the individual tool assemblies in accordance with a binary code, in order to simplify sensing of the code data during operation of the data-controlled machine tool. On the other hand, most machine operators and tool room attendants are not particularly familiar with binary notation. Consequently, they may frequently have difficulty in reading and interpreting the code data on a tool assembly. Mistakes may thus be made in the mounting of individual tool assemblies in a machine tool, the desired tool assemblies being omitted and incorrect tool assemblies being furnished to the data-controlled machine. Obviously, errors of this kind can have rather serious consequences with respect to slowdowns in operations and failure to perform the required machining operations.

Furthermore, in at least some tool assemblies, and particularly those described in the aforementioned application of Myron L. Anthony, it may be virtually impossible for the tool room attendant or the machine operator to read and interpret the code directly from the tool assembly. For example, if the code data is in the form of interspersed magnetic and non-magnetic code elements, and all of the code elements are formed from metal, they may be substantially indistinguishable upon visual observation. Furthermore, if the code elements are relatively small in size, it may be difficult for the machine operator or tool room attendant to determine whether a given blank space in the coded portion of the tool assembly entails two, three or more code positions, so that even when there is a physical difference between code elements used in the binary system there may be substantial difficulty in visual interpretation of the code.

Accordingly, it is an object of the present invention to provide a new and improved direct-reading identification device for coded tool assemblies which is effective to present a direct visual reading of the code data on a tool assembly.

Another object of the invention is to provide instantaneous translation, in a direct-reading tool assembly identification device, from a binary or other machine code into a decimal notation that can be conveniently read by a tool room attendant or machine operator.

Another object of the invention is to provide a direct-reading tool assembly identification device which is inherently self-protecting with respect to misalignment of the tool assembly in the device, in the course of a reading operation, so that an erroneous reading cannot be effected due to improper orientation of the tool assembly in the identification device.

Accordingly, the invention is directed to an automatic machine tool system of the kind including a plurality of substantially similar tool assemblies each bearing a plurality of code elements, the code elements being arranged in a predetermined data code to identify the tool assembly and provide for automatic control of its use in a machine tool. Usually, the code elements are arranged in accordance with a binary code. Specifically, the invention comprises a direct-reading tool assembly identification device which includes a base assembly that is provided with means for receiving a tool assembly in predetermined orientation. Typically, this base assembly may include a support cradle which receives and supports a tool assembly in a given fixed position. The device further includes sensing means, which are incorporated in the base assembly, for sensing the code data represented by the code elements on the tool assembly. This sensing means may comprise a plurality of individual sensing elements each actuatable between a first operating condition and a second operating condition, depending upon the code elements aligned therewith. An electrical translator is coupled to the sensing elements and is employed to translate the code data into electrical signals in a decimal code. The translator, in turn, is coupled to a visual indicator which presents a direct decimal-notation reading of the code data. In its preferred form, the device of the invention also includes further sensing means for checking the orientation of the tool assembly on the base assembly. This second sensing means, sometimes referred to herein as a position sensing mean, prevents operation of the visual indicator except when the tool assembly is disposed in the desired position on the base assembly.

Other and further objects of the present invention will be apparent from the following description and claims and are illustrated in the accompanying drawings which, by way of illustration, show preferred embodiments of the invention and the principles thereof and what is now considered to be the best mode contemplated for applying those principles. Other embodiments of the invention embodying the same or equivalent principles may be used and structural changes may be made as desired by those skilled in the art without departing from the invention.

In the drawings:

FIG. 1 is a front elevation view of a direct-reading tool assembly identification device constructed in accordance with one embodiment of the invention;

FIG. 2 is an end view of the device of FIG. 1;

FIG. 3 is a detail schematic diagram of one-half of the main electrical circuit of the identification device of FIGS. 1 and 2;

FIG. 4 is a side elevation view of a sensing mechanism for another embodiment of the invention, shown in association with a tool assembly;

FIG. 5 is a sectional view taken approximately along line 5—5 in FIG. 4;

FIG. 6 is a plan view of the sensing mechanism of FIG. 4; and

FIG. 7 is a circuit diagram utilized to explain the operation of the sensing mechanism of FIGS. 4–6.

FIGS. 1 and 2 illustrate the mechanical construction of a first embodiment of the invention comprising a direct-reading tool assembly identification device 10. The device 10 forms a part of an automatic machine tool system which utilizes a plurality of substantially similar tool assemblies, each tool assembly carrying a plurality of code elements arranged in accordance with a predetermined data code. In FIGS. 1 and 2, there is shown a typical tool assembly 11 comprising a toolholder 12 and an individual cutting tool 13 mounted in the toolholder. In this instance, it is the toolholder 12 which carries the code data in the form of a plurality of code rings 14 which are mounted on a selected portion of the toolholder. The mounting space for the code elements 14 is defined by a pair of collars 15 and 16 on the toolholder 12 (see FIG. 1). The toolholder 12 also includes a first shoulder element 17 located immediately adjacent the collar 15, and a second shoulder element 18 at the front of the toolholder immediately adjacent the collar 16. In the illustrated toolholder assembly 11, there are ten different code positions, providing for a total of one thousand twenty-four different code combinations in accordance with conventional binary notation.

The tool identification device 10 comprises a base assembly 21 which is primarily a housing for the operating circuits of the identification device. On the base assembly 21, however, means are provided for receiving a tool assembly such as the tool assembly 11 and for supporting the tool assembly in predetermined orientation on the base assembly. This means, in the embodiments of FIGS. 1 and 2, comprises a first support member or cradle 22 upon which the coded portion of the toolholder 12 is supported. In addition, a second support member or cradle 23 may be provided to support the rear or chuck portion of the toolholder 12. As shown in FIG. 1, the tool assembly 11 can be mounted in the combined support and receiving means 22, 23 in only one orientation, if both support members are to be engaged by the tool assembly. On the other hand, it might be possible for a machine operator or tool room attendant to reverse the position of the toolholder 12, so that it is supported only on the support member 22. However, this possibility is taken care of by the electrical operating circuits of the device 10, as explained in detail hereinafter.

Within the support member 22, on the base assembly 21, there are mounted a plurality of data sensing elements each actuatable between a first operating condition and a second operating condition in accordance with the location of the code elements 14 on the tool assembly 11. In this embodiment of the invention, these sensing elements comprise individual sensing switches 31, 32, 33, 34 and 35 (see FIG. 3). The sensing switches are positioned for engagement by the code rings 14 on the tool assembly 11 when the tool assembly is disposed in the cradle formed by the support members 22 and 23. The support member 22 also has mounted therein a pair of position sensing switches 37 and 38 (FIG. 3), these sensing switches being positioned to engage the shoulders 17 and 18, respectively, on the toolholder 12 (FIG. 1). These two sensing switches, which are independent of the code data sensing switches, are utilized to check the position of the toolholder assembly 11 on the base assembly 21.

The base assembly 21 houses the electrical circuits for the identification device 10; these electrical circuits include a translator which is connected and actuated by the sensing switches in the cradle 22. The translator 40, which is shown in detail in FIG. 3, is effective to translate binary code data into electrical signals in a decimal code. The translator, in turn, is coupled to visual indicator means, comprising, in this instance, four indicator devices 41, 42, 43 and 44 (FIG. 1). Each visual indicator device, may for example, comprise ten individual pilot lights each provided with a suitable lens and template or mask to afford a visual indication of a given number in accordance with decimal notation. Another type of indicator which may be used, and which is commercially available, includes seven minute lamps arranged in a given pattern to provide for the representation of the various numbers in the decimal system. The seven lamps are cross-connected, internally of the indicator, to ten input terminals by means of a resistance network which provides for energization of the desired combination of lamps for each decimal-system number. Yet another form of visual indicator which may be used is the device commonly referred to as the decatrode which includes a single lamp structure comprising a stack of ten individual filaments, each filament having the configuration of a given decimal-notation number.

Operation of the identification device 10 is quite simple. At the outset, the device is energized, as by actuation of a suitable master control switch 45. As long as there is no tool assembly disposed in the cradle 22, 23 the indicators 41–44 remain unenergized. When a tool assembly, such as the assembly 11, is placed in the cradle 22, 23 on the base assembly 21, the code data represented by the rings 14 are sensed and interpreted by the identification device. The code data are instantaneously presented as a direct visual decimal-notation reading by the indicators 41–44. Consequently, the tool assembly can be quickly and positively identified by a tool room attendant or machine operator as rapidly as the operator can place a tool assembly in the illustrated position, read the visual indication means 46 comprising the indicators 41–44, and remove the tool assembly to permit placement of the next tool assembly in sensing position. On the other hand, if a tool assembly is disposed in incorrect orientation on the cradle 22, 23, no data reading is obtained, so that the operator knows he must reposition the tool assembly in order to read and interpret the code data thereon. This applies whether the tool assembly is reversed end-for-end or is simply displaced longitudinally relative to the cradle.

FIG. 3 illustrates a typical operating circuit for controlling the indicator devices 41 and 42. In the identification device 10 (FIG. 1) the operating circuit for the two remaining indicator devices 43 and 44 may be essentially similar to that illustrated in FIG. 3 for the devices 41 and 42. Furthermore, the power supply for both circuits may be the same, as will be apparent from the following description of the sensing, translating, and indicator circuits.

The sensing system included in the electrical circuit of FIG. 3 comprises five relays A, B, C, D, and E. The operating coil for the relay A has one terminal connected directly to a D.C. power supply 47. The return circuit for the operating coil of the relay includes, in series, the first-order sensing switch 31 and the two position-sensing switches 37 and 38. The operating coil for the relay B has one terminal directly connected to the D.C. power supply, the other terminal of the coil being connected back to the power supply through the second-order sensing switch 32 and the position switches 37 and 38. The operating coils for the relays C, D and E are similarly connected in energizing circuits which include, in series, the data sensing switches 33, 34 and 35, respectively. Thus, in order to energize the relay A, it is necessary that the data sensing switch 31 be closed and also that the two-positioning-sensing switches 37 and 38 be closed. Furthermore, as long as the switches 37 and 38 are closed, each of the remaining relays B, C, D and E can be energized by actuation of the data sensing switches 32, 33, 34 and 35, respectively.

The relay A is provided with a series of units-control contacts A0 through A17, these contacts being arranged in pairs as illustrated in FIG. 3. The relay B, on the other hand, is provided with contacts B0–B11, used for units-control, and further contacts B12 through B17 which are employed for tens control. These contacts are also arranged in pairs in each instance. The contacts for the relay C are similarly designated, and also are arranged in pairs. In this instance, the units-control contacts comprise contacts C0 through C11 and the tens-control contacts are C12 through C17. The paired contacts for the relay D comprise the units-control contacts D0 through D17 and the tens-control contacts D18 through D21. The last relay, the relay E, includes only one pair of units-control contacts E0 and E1, and a single pair of tens-control contacts E2 and E3.

The units indicator 41 is provided with ten input terminals designated in FIG. 3 as by the reference characters "0" through "9." The tens indicator 42 may similarly be provided with ten input terminals, but only four of these terminals are utilized, and, accordingly, the others have been omitted from the drawings. In FIG. 3, it is assumed that the indicator devices 41 and 42 are of a type which is preferably energized from an A.C. source, the A.C. power supply for the visual indicators being designated by the reference numeral 51. All of the relays A–E and their contacts are shown in the operating position in which the relays are unenergized.

The first or "0" input terminal to the units indicator 41 is normally connected to the A.C. power supply through a circuit comprising, in series, the relay contacts A0, B0, C0, D0 and E0. Similarly, the "0" input terminal of the tens indicator 42 is normally connected to the A.C. power supply, through a circuit comprising, in series, the relay contacts D18 and E2. Thus, whenever the tool assembly identification device is energized but no tool assembly is disposed in the supporting cradle 22, 23 (see FIG. 1) the two indicators 41 and 42 each read "zero." By the same token, the similar circuit used for the other visual indicators 43 and 44 also provides for a "zero" reading as long as there is no tool assembly disposed in the required orientation on the base 21.

In order to understand the operation of the electrical translator 40, comprising the contacts of the individual relays A–E, a few typical examples of numerical readings may be employed. Thus, by way of example, it may be assumed that the code elements controlling the switches 31–35, on a given tool assembly correspond to those illustrated in FIG. 1, and particularly the first five code positions at the right-hand side of the tool assembly 11. As shown therein, there are code elements 14 located in the first, third, and fourth positions, reading from right to left, on this tool assembly. There are no code rings in the second and fifth positions, however. Consequently, the binary number with which the first five positions on the tool assembly 11 are encoded reads, in binary notation, as 01101. Furthermore, it may be seen that this same number would be represented, in the circuit of FIG. 3, by the closing of switches 31, 33 and 34, the switches 32 and 35 remaining open.

Upon closing of the switch 31, the relay A is energized, actuating each of the paired contacts A0–A17 from its normal to its alternate position. By the same token, the relays C and D are energized, actuating the paired contacts C0–C17 and D0–D21 to their alternate operating positions. On the other hand, the relays B and E remain unchanged, and the contacts B0–B17 and E0–E3 are not affected by the presence of the tool assembly in the identification device. With the circuit in this operating condition, it is seen that an energizing circuit is completed from the "3" contact of the units indicator 41 to the A.C. power supply 51 through the contacts A13, B6, C3, D1 and E0. A review of all of the other connections to the input terminals of units indicator 41 reveals that no input signal is applied to any of the other nine terminals of the indicator device. Furthermore, the "one" input terminal to the tens indicator 42 is now connected to the A.C. power supply through a circuit comprising, in sereis, the contacts C13, D19 and E2. This is the only effective operating circuit which is completed from the A.C. source 51 to the tens indicator. It is thus seen that the reading on the two indicators 41, 42 is the numeral 13, in decimal notation, and that this corresponds to the binary number 01101 with which the tool assembly 11 is encoded.

A substantially simpler example may be considered, in which only the sensing switch 31 is closed and the remaining switches 32–35 are unactuated. Under these conditions, the relay A is energized, and an operating circuit is completed to the "1" input of the units indicator 41 through a circuit comprising the relay contacts A1, B0, C0, D0 and E0. No other complete operating circuit is established to the units indicator, and the input to the tens indicator 42 remains the same, the "0" terminal being connected to the A.C. power supply 51. Consequently, the indicators provide a reading of 01, the correct translation of the corresponding binary indication.

By way of further example, a condition may occur in which only the sensing switch 35 is actuated to its closed position. When this happens, the A.C. power supply 51 is connected to the "6" input terminal of the units indicator 41 through a circuit comprising, in series, the contacts E1, A16, B8, C4 and D2. Furthermore, the A.C. power supply is also connected to the "1" input terminal of the tens indicator 42 by a circuit comprising, in series, the contacts E3, D20 and C14. Thus, for the binary numeral 1000 the reading on the indicators is 16, in decimal notation, a correct translation of the code reading.

As a final example, the operating condition may be considered in which the switches 33 and 35 are both actuated, energizing the relays C and E. This being the case, the "0" terminal of the units indicator 41 is connected to the A.C. power supply 51 through an operating circuit, comprising, in series, the contacts E1, A16, B8, C5 and D4. At the same time, the "2" input to the tens indicator 42 is energized through a circuit comprising, in series, the contacts C15, D20 and E3. Furthermore, no other operating circuits are completed to either of the indicator devices 41 and 42, with the result that the decimal notation reading on the indicators is 20, corresponding to the binary number 10100 sensed by the switches 33 and 35. An exhaustive review of the remaining possible relay connections will reveal that for each switch combination there is a fixed combination of two complete energizing circuits to the indicators 41 and 42 and that, in each instance, the indicators afford a direct visual reading of the binary code data in decimal-notation form. However, it should be remembered that, if the position-sensing switches 37 and 38 are not closed, no output reading other than 00 is achieved, since energization of the relays A–E depends in each instance upon closing of both of the switches 37 and 38. The switches 37 and 38 are positioned to engage the tool assembly shoulders 17 and 18, respectively, as noted hereinabove. In the tool assembly 11, these two shoulders may be of different diameters, so that these position-sensing switches cannot be closed when the position of the tool assembly is reversed end-for-end. On the other hand, and as a final check, it may also be desirable to incorporate yet another sensing switch 52 in the auxiliary cradle or support member 23 to make sure that the tool assembly 11 is properly positioned in the device 10 (see FIG. 1). If this is done, the switch 52 may be connected in series with the switches 37 and 38 as shown in FIG. 3.

FIGS. 4–7 illustrate another sensing arrangement which may be utilized in a direct-reading tool assembly identification device constructed in accordance with the invention. FIGS. 4–6 illustrate the mechanical arrangement for the base assembly and sensing means, in this instance, for an identification device 110. The base assembly 121 has mounted thereon a pair of support members 122 and 123 which are generally similar to the support members 22 and 23 and which afford a support or cradle for a tool assembly 111. The tool assembly 111 comprises a toolholder 112 in which a cutting tool 113 is mounted. The code data for the tool assembly, in this instance, comprises a plurality of rings 114 which are mounted on the toolholder 112 between a pair of collars 115 and 116. The rings 114 are substantially indistinguishable, from their physical appearance, but differ from each other in their magnetic properties. That is, the code elements 114 are selected from two groups, one group of code elements having a relatively low magnetic reluctance and the other group being of a high-reluctance material. Accordingly, the two groups are substantially different from each other with respect to their magnetic field-coupling properties, although they may be physically similar in all other respects. It will be appreciated, therefore, that it is very difficult and in fact may be virtually impossible to read the code data comprising the code elements 114 by visual inspection. As before, the toolholder 112 includes a pair of shoulder members 117 and 118 adjacent the collars 115 and 116 respectively.

The sensing means, in the device 110, is again incorporated in the cradle or support member 122. In this instance, the sensing means comprises a plurality of individual sensing devices each actuatable between a first operating condition when disposed in proximity to code elements of the two different groups comprising the code elements 114. In FIG. 6, the first five sensing devices are identified by the reference numerals 131–135 at the positions corresponding to the positions of the code data sensing switches 31–35 in the previously described embodiment. FIG. 6 also shows the location of the two position-sensing switches 137 and 138 in the support member 122, these switches being essentially similar in location and function to the switches 37 and 38 in the previously described embodiment.

FIG. 5 shows the internal construction of one of the sensing devices 131. As illustrated therein, the sensing device 131 comprises a substantially U-shaped magnetic core 170 having a pair of legs 171 and 172 projecting upwardly toward the code ring 114 at the first code position on the tool assembly 111. A pair of coils 173 and 174 are wound upon the legs 171 and 172, respectively, of the core 170. Suitable electrical connections are provided for each of the two coils, as generally indicated by reference numeral 175.

FIG. 7 illustrates a typical electrical circuit in which the sensing device 131 may be incorporated. As shown therein, one terminal of the coil 174 is connected to an A.C. supply 151 through a circuit which includes, in series, the two position-sensing switches 137 and 138, the other terminal of the coil 174 being grounded. The coil 173, on the other hand, is connected in series with the operating coil of the relay A to afford an energizing circuit for the relay. A diode 176 may be included in the operating circuit for the relay, if desired. On the other hand, an A.C.-actuated relay may be utilized in this embodiment of the invention, in which case the diode 176 is not necessary. It may also be desirable to include a current-limiting resistor in the relay circuit, or some other provision may be made for limiting the current drawn by the sensing device 131.

The circuit illustrated in FIG. 7 also includes four additional sensing devices 132, 133, 134 and 135 which are coupled to the A.C. supply 51 and to the relays B–E, the operating circuits for the relays and their associated sensing devices being essentially similar to that described hereinabove for the device 131. As before, the contact elements of the relays A–E are incorporated in a translator network 40 which is utilized to control the energization of the units indicator 41 and the tens indicator 42. This translation circuit may be essentially similar to that described hereinabove in connection with FIG. 3. Thus, translation is effected in the same manner as in the previously described embodiment of the invention, except that the energization of the relays A–E is controlled by the sensing devices 131–135 instead of sensing switches 31–35.

Sensing, in the embodiments of FIGS. 4–7, is accomplished by simple transformer action. Thus, whenever there is no code element 114 positioned in proximity to any of the sensing devices, the relays A–E remain unenergized and the reading on the indicators 41, 42 is "00," since the magnetic core of each of the sensing transformers is open. Considering the sensing device 131, it may be seen that a non-magnetic code element may be positioned in proximity to the two legs 171 and 172 of the sensing element core 170. When this is done, the operating condition of the sensing device 131 remains essentially unchanged, since the magnetic circuit comprising the core 170 is still open. On the other hand, if a low-reluctance magnetic code element is disposed in the sensing position 114A, the magnetic circuit of the transformer is effectively completed. Under these conditions, an energizing signal of substantial amplitude is effectively translated through the sensing element 131 to the operating coil of the relay A. Thus, the relay is energized, in essentially the same manner as by closing of the switch 31 in the embodiment illustrated in FIG. 3. Accordingly, it is seen that the field-sensitive sensing means comprising the sensing devices 131–135 actuates the relays A–E in the same manner as the switches 31–35 in the circuit of FIG. 3. In this embodiment, it may be necessary to utilize an amplifying device such as a self-rectifying transistor or thyratron between each transformer and its relay, due to the inherent low-level nature of the sensing transformers.

In some instances, as noted hereinabove, it may be desirable to utilize electrically conductive and non-conductive code elements for encoding the tool assemblies. If this is done, the transformers 131–135 may be replaced by substantially similar capacitor devices to effect the same requisite sensing action. Inasmuch as it is considered that this modification makes no basic changes in the circuit of FIG. 7, it has not been illustrated in the drawings. Sensing devices of this general kind are referred to in the co-pending application of Myron L. Anthony, Serial No. 23,071, filed April 18, 1960.

Of course, other translator networks can be used instead of the relay translator 40 shown in detail in FIG. 3. For example, diode matrices have been employed, in the past, for equivalent translation purposes, and this is equally true with respect to magnetic core translator circuits. It should be understood that translator devices of this kind, which are well known in the art, can be utilized instead of the specific relay network shown herein without departing from the present invention.

From the foregoing description, it is seen that the present invention affords a direct-reading identification device for coded tool assemblies which might otherwise be difficult or even impossible for a tool room attendant or a machine operator to read. Translation and reading is essentially an instantaneous operation, despite the fact that the tool assemblies are not encoded in decimal notation. The identification device of the invention is inherently self-protecting with respect to orientation and alignment of the tool assembly. Consequently, an erroneous reading due to misuse of the device by an operator is rendered virtually impossible. Of course, the code data carried by the tool assemblies may pertain to the operation to be effected by an automatic data-controlled machine tool as well as to the particular kind of cutting element or other tool incorporated in each assembly.

Hence, while preferred embodiments of the invention have been described and illustrated, it is to be understood that they are capable of variation and modification.

I claim:

1. In an automatic machine tool system including a plurality of substantially similar tool assemblies each bearing a plurality of code elements arranged in a predetermined data code to identify the assembly and control the use thereof in an automatic machine tool, a direct-reading tool assembly identification device comprising: a base assembly, including means for receiving and holding a tool assembly in predetermined orientation; sensing means, included in said base assembly, for sensing the code data represented by the code elements on a tool assembly disposed in said predetermined orientation; an electrical translator, coupled to said sensing elements, for translating said code data into electrical signals in a decimal code; and visual indicator means, coupled to said translator, for presenting a direct visual decimal-notation reading of said code data.

2. In an automatic machine tool system including a plurality of substantially similar tool assemblies each bearing a plurality of code elements arranged in a predetermined data code to identify the assembly and control the use thereof in an automatic machine tool, a direct-reading tool assembly identification device comprising: a base assembly, including means for receiving and holding a tool assembly in predetermined orientation; sensing means, included in said base assembly, comprising a plurality of sensing elements each actuatable between a first operating condition and a second operating condition in accordance with the code data represented by the code elements on a tool assembly disposed in said predetermined orientation; an electrical translator, coupled to said sensing elements, for translating said code data into electrical signals in a decimal code; and visual indicator means, coupled to said translator, for presenting a direct visual decimal-notation reading of said code data.

3. In an automatic machine tool system including a plurality of substantially similar tool assemblies each bearing a plurality of code elements arranged in a binary code to identify the assembly and control the use thereof in an automatic machine tool, a direct-reading tool assembly identification device comprising: a base assembly, including a support cradle for receiving and supporting a tool assembly in predetermined orientation; sensing means, included in said base assembly, comprising a plurality of sensing switches each actuatable between a first operating condition and a second operating condition by engagement with said code elements on a tool assembly disposed in said cradle in said predetermined orientation; an electrical translator, actuated by said sensing switches, for translating said binary code data into electrical signals in a decimal code; and visual indicator means, coupled to said translator, for presenting a direct visual decimal-notation reading of said code data.

4. In an automatic machine tool system including a plurality of substantially similar tool assemblies each bearing a plurality of code elements arranged in a predetermined data code to identify the assembly and control the use thereof in an automatic machine tool, a direct-reading tool assembly identification device comprising: a base assembly, including means for receiving and holding a tool assembly in predetermined orientation; data sensing means, included in said base assembly, for sensing the code data represented by the code elements on a tool assembly disposed in said predetermined orientation; an electrical translator, coupled to said sensing elements, for translating said code data into electrical signals in a decimal code; visual indicator means, coupled to said translator, for presenting a direct visual decimal-notation reading of said code data; position sensing means, included in said base assembly, for determining whether a tool assembly is disposed in said predetermined orientation therein; and circuit means, coupling said position sensing means to said indicator means, for inhibiting operation of said indicator means except when a tool assembly is disposed in said predetermined orientation in said base assembly.

5. In an automatic machine tool system including a plurality of substantially similar tool assemblies each bearing a plurality of code elements comprising two groups identifiable by their field-coupling properties and arranged in a predetermined data code to identify the assembly and control the use thereof in an automatic machine tool, a direct-reading tool assembly identification device comprising: a base assembly, including means for receiving and holding a tool assembly in predetermined orientation; sensing means, included in said base assembly, comprising a plurality of individual field-sensitive sensing devices each actuatable between a first operating condition and a second operating condition when in close proximity to code elements of said two different groups, for sensing the code data represented by the code elements on a tool assembly disposed in said predetermined orientation; an electrical translator, actuated by said sensing devices, for translating said code data into electrical signals in a decimal code; and visual indicator means, coupled to said translator, for presenting a direct visual decimal-notation reading of said code data.

6. In an automatic machine tool system including a plurality of substantially similar tool assemblies each bearing a plurality of code elements arranged in a predetermined data code to identify the assembly and control the use thereof in an automatic machine tool, a direct-reading tool assembly identification device comprising: a base assembly, including means for receiving and supporting a tool assembly in predetermined orientation; sensing means, included in said base assembly, comprising a plurality of sensing elements each actuatable between a first operating condition and a second operating condition in accordance with the code data represented by the code elements on a tool assembly supported in said predetermined orientation on said base assembly; an electrical translator, comprising a corresponding plurality of relays individually coupled to respective ones of said sensing elements, for translating said code data into electrical signals in a decimal code; visual indicator means, coupled to said translator, for presenting a direct visual decimal-notation reading of said code data; and means for inhibiting actuation of said visual indicator means except when a tool assembly is accurately oriented relative to said base assembly.

References Cited in the file of this patent
UNITED STATES PATENTS 2,628,572    Goff _____ Feb. 17, 1953

FOREIGN PATENTS 800,190    Great Britain _____ Aug. 20, 1958